United States Patent [19]

Harris et al.

[11] 4,225,443
[45] Sep. 30, 1980

[54] SINTERED-GLASS-GRANULE FILTER MEDIUM

[75] Inventors: Robert H. Harris, Norcross; John S. Lamica, Chamblee, both of Ga.

[73] Assignee: The Taulman Company, Atlanta, Ga.

[21] Appl. No.: 888,918

[22] Filed: Mar. 22, 1978

[51] Int. Cl.² .............. B01D 23/10; B01D 15/00; B01D 15/02

[52] U.S. Cl. .................. 210/510; 210/509; 210/263; 210/290; 210/268; 428/406; 106/40 V; 106/47 R

[58] Field of Search .......... 428/404, 406; 210/263, 210/268, 290, 509, 510, 80, 82; 65/18, 22; 106/40 V, 52, 40 R, 47 R

[56] References Cited

U.S. PATENT DOCUMENTS

| | | | |
|---|---|---|---|
| 3,354,024 | 11/1967 | D'Eustochio et al. | 428/406 |
| 3,382,983 | 5/1968 | Stewart | 210/503 X |
| 3,414,394 | 12/1968 | Poad | 210/510 X |
| 3,497,068 | 2/1970 | Hirsch | 210/290 X |
| 3,704,786 | 12/1972 | Lerner et al. | 210/504 X |
| 3,811,851 | 5/1974 | Mackenzie | 65/22 |
| 3,814,247 | 6/1974 | Hirs | 210/290 |
| 3,842,006 | 10/1974 | Burt | 210/263 X |
| 3,900,303 | 8/1975 | Mackenzie | 65/22 X |
| 3,929,130 | 12/1975 | Hargest | 210/290 X |
| 4,081,259 | 3/1978 | Bassin et al. | 65/22 X |
| 4,113,915 | 9/1978 | Schott | 428/406 X |

*Primary Examiner*—George F. Lesmes
*Assistant Examiner*—Daniel R. Zirker
*Attorney, Agent, or Firm*—Berman, Aisenberg & Platt

[57] ABSTRACT

Sintered glass pellets which generally decrease in particle size as they increase in specific gravity provide a unique filter medium which varies from larger pellets at its inlet (upstream) upper portion to smaller pellets at its outlet (downstream) lower portion. In view of the variation in specific gravity, particles forming the filter medium generally resume substantially their initial respective positions after the medium is back-flushed for cleaning. Although pellets throughout the medium differ in specific gravity, they are made of the same ingredients. The individual pellets are formed by granulating finely-ground glass with a suitable binder and sintering the resulting granules.

19 Claims, 4 Drawing Figures

SINTERED-GLASS-GRANULE FILTER MEDIUM

BACKGROUND

There are many processes and techniques for removing suspended particles from liquids. Traditionally, silica sand has been one of the major materials used for filtration purposes, both in the municipal and in the industrial sectors. However, a single-media filter, such as one of sand, has disadvantages which are well known to those in the filtration industry. A single-media filter bed is unable to handle high-solids loading without plugging. The need to handle higher-solids loading and, concurrently, to operate at higher filtration rates resulted in developing a dual-media filter composed of one or more layers of anthracite coal (specific gravity 1.48 to 1.65) over a layer of silica sand (specific gravity 2.65). Due to the differences between these two materials in specific gravity, the average particle size of the anthracite can be approximately 2 to 3 times that of the sand, and yet the anthracite will still remain above the sand when the filter is cleaned by back-flushing.

Since the development of dual-media beds, many attempts have been made to create a reverse-graded bed in which the particle size and, hence, porosity are largest at the surface where initial contact with suspended particles is made, gradually decrease throughout the bed depth, and are thus finest near the filter effluent. This reverse-graded bed has advantages over conventional dual-media beds. Attempts to create these reverse-graded beds have been made by using different materials which have different specific gravities. A number of patents have been issued for such beds, beginning with the Hyatt U.S. Pat. No. 293,745, and more recently with U.S. Pat. Nos. 3,382,983, 3,497,068 and 3,343,680. One attempt to create a reverse-gradation bed resulted in coating silica sand with a thermoplastic material having a specific gravity of less than 1. This is described in U.S. Pat. No. 3,704,786.

Additionally, many attempts have been made to manufacture synthetic filter media. Essentially, all of those utilize some form of thermoplastic material:

U.S. Pat. No. 3,544,457, Polyvinyl Chloride
U.S. Pat. No. 3,471,025, Polypropylene
U.S. Pat. No. 3,617,590, Thermoplastic
U.S. Pat. No. 3,557,955, Polyvinyl Chloride
U.S. Pat. No. 3,842,006, Thermoplastic
U.S. Pat. No. 3,502,434, Polyethylene
U.S. Pat. No. 3,463,320, Styrene Unfortunately, all synthetic-plastic filter media cost 8 to 10 times more than conventional inorganic materials used for filtration. This has made their commercial utilization very limited.

Backflush filter beds for removing solids from liquids passed therethrough are reported in U.S. Pat. No. 3,343,680 to Rice, wherein plural layers of different filter media, e.g. nylon, different-density polyethylenes (Example 4), magnetite ($Fe_3O_4$), ilmenite ($FeO.TiO_2$), garnet, tabular alumina (heat-processed aluminum oxide), graphite rock, anthracite coal (widely used for water filtration) and silica sand (column 3, lines 1 to 22), are graded inversely with respect to size and specific gravity. As various filter media, such as anthracite coal, increase in cost and decrease in availability, substitute materials are sought.

As waste glass comprises from 8 to 12 percent by weight of municipal refuse and presents a severe disposal problem, both government and private agencies have devoted considerable energy and expertise to product development using such glass as raw material. In "Glasphalt", used for road surfacing, crushed glass is combined with asphalt. The U.S. Bureau of Mines has used waste glass for making such products as tiles, bricks and glass wool. Glass-polymer composite (GPC) materials, prepared from crushed waste glass, is useful for making sewer pipe. Foamed glass panels and other structural materials have been made from waste glass, and a number of patents, e.g. U.S. Pat. Nos. 3,811,851, 3,900,303 and 3,963,503, are directed to such foamed glass.

Spent sulfite liquor is another waste product which presents a disposal problem. It is a well-established and recognized product (cf. "The Condensed Chemical Dictionary", fourth edition, page 635, Reinhold Publishing Corporation, 1950; Clark, "The Encyclopedia of Chemistry", second edition, pages 1021 and 1022, Van Nostrand Reinhold Company, 1966; Grant, "Hackh's Chemical Dictionary", fourth edition, page 646, McGraw-Hill Book Company, 1969) which contains lignin or lignin sulfonate (also lignosulfonate) and is used as a tanning agent, a binding agent, a mordanting agent, an adhesive or for fermentation. The nature of lignin or of lignin sulfonate is confirmed by "The Condensed Chemical Dictionary", page 397, supra; "The Merck Index", ninth edition, page 717 (5326), Merck & Co., Inc., 1976; Grant, page 389, supra; and "McGraw-Hill Encyclopedia of Science and Technology", third edition, volume 14, pages 604 and 605, McGraw-Hill, Inc., 1971.

Lignins are commercially available in the form of a 45 percent by volume aqueous solution which is extremely viscous and difficult to work with. This solution is advantageously diluted to 9 percent by volume to provide a more easily usable product.

According to Freudenberg [*Modern Methods of Plant Analysis*, Vol. III (K. Paech and M. V. Tracey, eds.), page 507, Springer, Berlin, 1955; and *Science*, Vol. 148, page 595, 1965] lignin is considered to be a system of thermoplastic tridimensional polymers derived from coniferyl alcohol or other quaiacylpropane monomers. It is insoluble in water, in most organic solvents and in strong sulfuric acid. It contains the major portion of the methoxyl content of the wood. It has a characteristic ultraviolet absorption spectrum and gives characteristic color reactions with many phenols and aromatic amines. It has a variable elementary composition and methoxyl content. It reacts readily with sodium bisulfite or thioglycolic acid to form soluble products. It is unhydrolyzable with acids, readily oxidizes, is soluble in hot alkali, and readily condenses with alcoholic and phenolic compounds. It yields up to 25 percent vanillin when oxidized with alkaline nitrobenzene and Hibbert's monomers when boiled under reflux with ethanol and a little hydrogen chloride.

SUMMARY OF THE INVENTION

Finely-ground glass, e.g. recycled container glass, is mised with a suitable binder and water, agglomerated into composite particles, e.g. granules, placed into a rotary kiln or other suitable heating device to produce a hard durable pellet which is useful in the preparation of a variable-density filtering medium. In the final preparation of the pellets, the composite particles are heated to a temperature above the annealing point, but below the melting point, of the employed finely-ground glass. By controlling the temperature within the kiln and the heat-treatment time, pellets of any desired specific gravity from about 2.6 to less than 1.0 are produced.

By varying the size and specific gravity of thus-prepared glass pellets, a filtering medium is prepared so that it will stratify hydraulically to produce a filter bed with a continuously-increasing number of particles per unit area in the direction of liquid flow, resulting in an infinitely-varying specific gravity from about 2.6 at the bottom to about 1.25 or less at the top.

An object of this invention is to provide an efficient means for removing suspended particles from liquids, utilizing a filtering medium and process which result in extremely high through-put. This high rate of operation requires the use of fewer filters, resulting in a reduction in cost for a given-capacity treatment process. It also allows capacity to be increased at existing treatment facilities merely by replacing the filter medium with the instantly-described medium.

Another object is to provide filters suitable for longer filter runs with a subsequent lower requirement for cleaning.

A further object is to provide a filter bed which does not utilize anthracite coal, thus making the anthracite previously used for filtration purposes available as an energy source.

A still further object is to provide a filter medium composed of pellets or granules which vary in both size and specific gravity from the inlet to the outlet thereof. An additional object is to have the specific gravity of individual pellets or granules vary inversely with particle size so that back-flushing the filter will not substantially alter the relative positions of individual granules or pellets thereof.

It is also an object of this invention to reclaim and recycle waste-glass products without the necessity for color sorting, cleaning or removing metal or plastic particulate matter. The solid waste collected in many cities contains hundreds of tons of used-glass containers. Many municipalities are currently installing plants for the treatment of their solid waste, separating them into paper, metals and glass, with the hope that these can then be converted into usable products. The waste glass thus recovered consists of glass, of many different colors and types, mixed with paper and plastic labels, metal caps, and a number of other items. Most of the uses for these waste-glass products require hand sorting by color and cleaning prior to reuse. The unsorted and uncleaned waste glass has been used as a filler material for road beds by mixing it with asphalt and tar. However, the present invention takes waste glass containers, a form of solid-waste pollution, and utilizes them to manufacture a product suitable for solving water-pollution problems.

Another object is to use a second waste product, lignin. This is a waste product of the pulp and paper industry and is a major by-product of the sulfite-pulping process. Lignin is a wood by-product which has many uses, but, at the present time, still constitutes a major pollution and disposal problem. The present invention utilizes lignin (usually in lignosulfonate form) in the manufacture of a useful product.

DETAILS

A number of generally-sequential stages or aspects combine to form a single invention in which each distinct stage or aspect is a fundamental and critical part. For greater understanding, each stage is preliminarily defined. The first requires ground glass particles, substantially all of which are finer than 50 mesh (U.S. Sieve Size), preferably at least 95 percent by weight passing a 100-mesh or even a 200-mesh screen. Grinding glass to such a particle size is not novel and is not part of this invention. The glass actually used for the present invention, however, is either new glass or waste glass. Whichever is used, a new use for such glass is provided. When waste glass is used, a further advantage is that of providing an economical use for a product which is recognized as presenting a severe disposal problem.

In order to form composite masses or granules from the finely-divided ground glass, a binder is required which will wet the glass and assist in agglomerating small glass particles. Although a number of recognized conventional binders are suitable for this purpose, lignin or lignin sulfonates are advantageously used because they also constitute waste products which present recognized disposal problems. In fact, the lignin or lignin sulfonates employed are optionally in the form of sulfite waste liquor. Although such liquor has been used as a binder for briquettes, it is not known to have been used for binding finely-ground glass particles together.

The finely-ground glass particles are agglomerated with a suitable, preferably aqueous, binder to form granules or composite particles which are advantageously from about 4 to about 50 mesh and, more desirably, from about 5 to about 35 mesh in size. Larger composite masses can be reduced to the indicated size range, and smaller composite masses are optionally recycled for agglomeration with additional finely-ground glass particles. Agglomeration is preferably effected in the absence of any external pressure. No mold or cast is required or desired. Useful composite particles are readily formed by molding, casting, stamping or extruding, but sintered pellets prepared from such composite particles (when formed under pressure) are materially different from corresponding sintered pellets formed from agglomerates prepared without the use of external pressure.

In place of sulfite liquor a conventional binder, such as bentonite, clay, fuller's earth, kaolin, cornstarch, sodium silicate, hydrated lime, molasses, asphalt, tar, pitch, (waste) oil, acrylic emulsion, acids, resin and Portland cement, is alternatively used for granule formation.

The composite ground-glass particles or granules are sintered to form substantially-spherical pellets having densities ranging from about 1.0 or even below to about 2.5. As sintering time and temperature control the specific gravity of produced pellets, the final specific gravity of each pellet can be controlled within specified ranges. It is particularly advantageous to have the pellets increase in specific gravity from about 1.25 to about 2.60 inversely with a decrease in particle size from about 5 mesh to about 35 mesh. This is accomplished to some extent by classifying the composite finely-ground glass particles or granules into those ranging from 5 to 10 mesh, those ranging from 10 to 18 mesh and those ranging from 18 to 35 mesh, processing the larger particles to have a specific gravity of about 1.25, the medium-sized particles to have a specific gravity of about 1.50 and the finer particles to have a specific gravity of about 2.60. Naturally, additional groupings and a greater number of stages of specific-gravity differentiation may be employed.

The produced pellets are classified into their respective specific-gravity ranges. Those pellets which fail to satisfy size and specific-gravity requirements are optionally recycled to the grinder so as to avoid any waste.

Different-size granules varying in specific gravity are selected to form a filter bed. The filter bed should have at least 5 percent by weight of each range (both in size and specific gravity) of pellet. Although filter beds can be prepared from pellets of only two different size ranges, a minimum of three different-size pellets is far more desirable. The total number of size ranges (with corresponding specific gravities) can be almost infinite. The actual amount of particles of any particular size or specific-gravity range depends largely on the nature of solid contaminants that are to be removed from a contaminated liquid filtered through the filter bed.

By having a normal down-flow feed of contaminated liquid, e.g. water, through a filter bed having larger and less-dense particles at the inlet upstream end and more-finely divided denser particles at the lower downstream end, backflushing is facilitated when the filter becomes clogged. Such backflushing separates the clogging solids without any substantial reorientation of the pellets which comprise the filter bed. The denser and finer particles remain at the base or outlet end of the bed, whereas the less-dense and larger particles remain at the upper inlet portion of the bed. Intermediate layers retain their corresponding relative positions.

Although the invention can be practiced with glass from virtually any source as long as the glass is free from toxic soluble constituents, it is most advantageous to use junk glass, which contributes to a waste-disposal problem of immense magnitude. By crushing, grinding, agglomerating, pelletizing, sintering and classifying, glass is formed into particles suitable for a filter medium which has unusual and desirable properties. Composite glass particles are hard, low in specific gravity, inexpensive and otherwise substantially equivalent to conventionally-employed material, such as anthracite and sand, in filtering and removing suspended matter from a liquid containing same. Additionally, lower specific gravities, commonly 1.3 to 1.55, require materially less backwash water to flush suspended matter from a bed of this material, thus making it more-economically efficient.

The filter medium is useful in any type of filtration vessel, whether it be circular or square, whether it be by gravity or pressure and whether it be upflow or downflow.

Novel, finely-ground glass-particle agglomerates are formed with a suitable binder and sintered into glass pellets which are useful in the form that they are produced. Filter beds prepared from these pellets are useful for filtering water and waste water, which normally requires a filter medium particle of from 0.5 to 3.0 millimeters. This size requirement is readily satisfied by the instant sintered-glass pellets. The technology for screening the material and arranging it in a suitable bed is well known and is not considered a part of this invention.

The sintered glass pellets are either used alone or in conjunction with other materials, e.g. garnet, ilmenite or sand, of higher specific gravities (both garnet and ilmenite have a specific gravity of 4.0) to produce a filter bed having a coarse to fine gradation. Liquid contaminated with solid particles is passed through a filter bed of sintered-glass pellets at rates of from 0.5 to 50 gallons per minute per square foot of filter area. The size of the sintered glass pellets generally ranges from about 10 millimeters at the inlet side of the filter to about 0.3 millimeter at the outlet or downstream part of the filter. Correspondingly, the specific gravity of the sintered pellets varies, e.g., from about 1.3 or lower at the inlet upstream part of the filter to about 2.6 at the outlet downstream portion thereof.

The highest specific gravity normally obtainable for sintered glass pellets according to this invention is about 2.6, which is the specific gravity of the glass feed material. However, in some applications, filter media having a higher specific gravity are desired or required in order to keep particles of a given size at the bottom of the filter bed. For this purpose higher-density filter media, e.g. garnet, ilmenite or sand, are optionally combined with sintered-glass pellets to produce a dual-media filter bed. Finer particles of garnet, ilmenite or sand are readily combined with filter media according to this invention to form a composite filter bed with the advantages of the subject sintered-glass pellets and those of the combined higher-density material.

Figure 1:
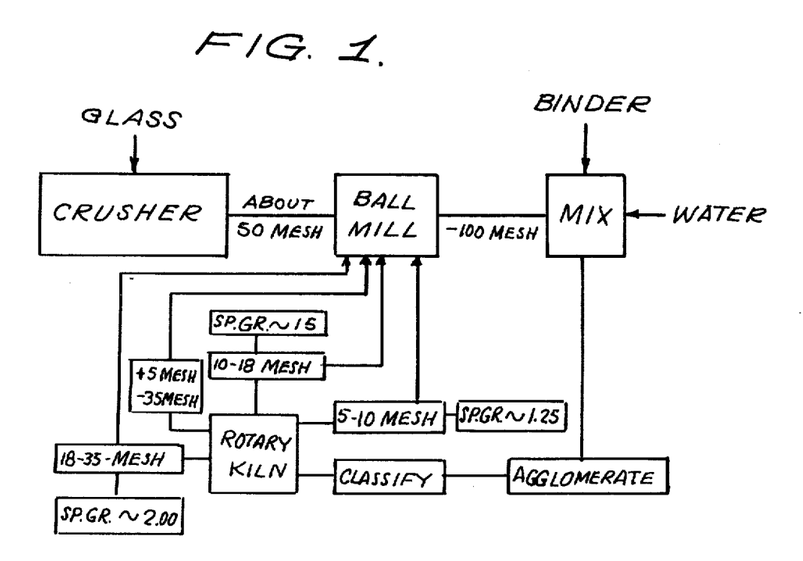
FIG. 1 is a flow diagram of the process.

With reference to FIG. 1, glass (new or used), e.g. container glass, from virtually any source is employed. From an economic standpoint container glass (recycled in a solid-waste-recovery operation) is most desirable. Such material need not be sorted by color or source, and the employed glass suitably ranges in size from approximately 30 mesh to about 6 mesh. When used-container glass is employed, the glass is normally in combination with particles of labels, caps and sealing strips. A fairly-wide range of contaminants is readily tolerated. Most metals, with the exception of those which are toxic, present no problem. In fact, no toxic metals have yet been found in waste-recycled glass. Organic material is decomposed during the sintering step and also presents no problems.

The glass is crushed in a conventional crusher so that virtually all of its passes through a 50-mesh (U.S. Sieve Size) screen. Ball milling or any other suitable particle-size reduction means is employed for this purpose.

The crushed glass is then finely ground or pulverized so that a substantial proportion, if not all, thereof passes a 100-mesh (U.S. Sieve Size) screen. The grinding is conventionally conducted in, e.g., a ball mill.

Many methods of particle agglomeration are commercially known, and any suitable process is useful for the next step. Known techniques include briquetting, granulating and pelletizing, each of which is acceptable. Such agglomeration is effected, e.g., by pan-pelletizing the pulverized glass. In order to impart sufficient strength to resulting pellets for further operations, a suitable adhesive binder must be used. The binder must naturally be one which wets the finely-ground glass particles and permits agglomeration thereof. Although any conventional binder which satisfies these requirements is acceptable, it is particularly advantageous to use a material which is a waste product and which also presents severe disposal problems.

The adhesive binder of choice is a waste product from the pulp and paper industry known as sulfite waste liquor or, perhaps, spent sulfite liquor, the active-adhesive binder ingredient of which is lignin or lignin sulfonate. Although neither lignin nor lignin sulfonate is a specific compound of well-defined structure, both materials are known, recognized and used for numerous commercial purposes. Lignin comprises a group of high-molecular-weight amorphous materials which are, chemically, closely related.

For the instant purpose spent liquor from a sulfite-pulping process, which contains approximately 45 percent by weight of lignin in the form of lignosulfonic acid (ordinarily mixed with sugars and other carbohydrate decomposition products, wood extractives and pulping chemicals) is useful as binder without any separation or purification. In fact, water is ordinarily added to the admixture of spent sulfite liquor and finely-ground glass particles to provide a consistency most suitable for agglomeration, e.g. for pan pelletization. The concentration of lignins based upon the dry weight of finely-divided glass particles, is suitably from about 0.5 to 15 percent, preferably about 0.75 percent, by weight, and the moisture content is suitably from 15 to 30 percent by weight.

Particles formed during pan pelletization are screened to remove granules or composite glass particles which are either too large or too fine for ultimate use in a filter bed. Normally, fine smaller than 0.3 millimeter and granules larger than 4 millimeters are removed. The fines are suitably recycled for further agglomeration, and the larger particles are suitably broken down to a usable size and recycled.

Figure 2:
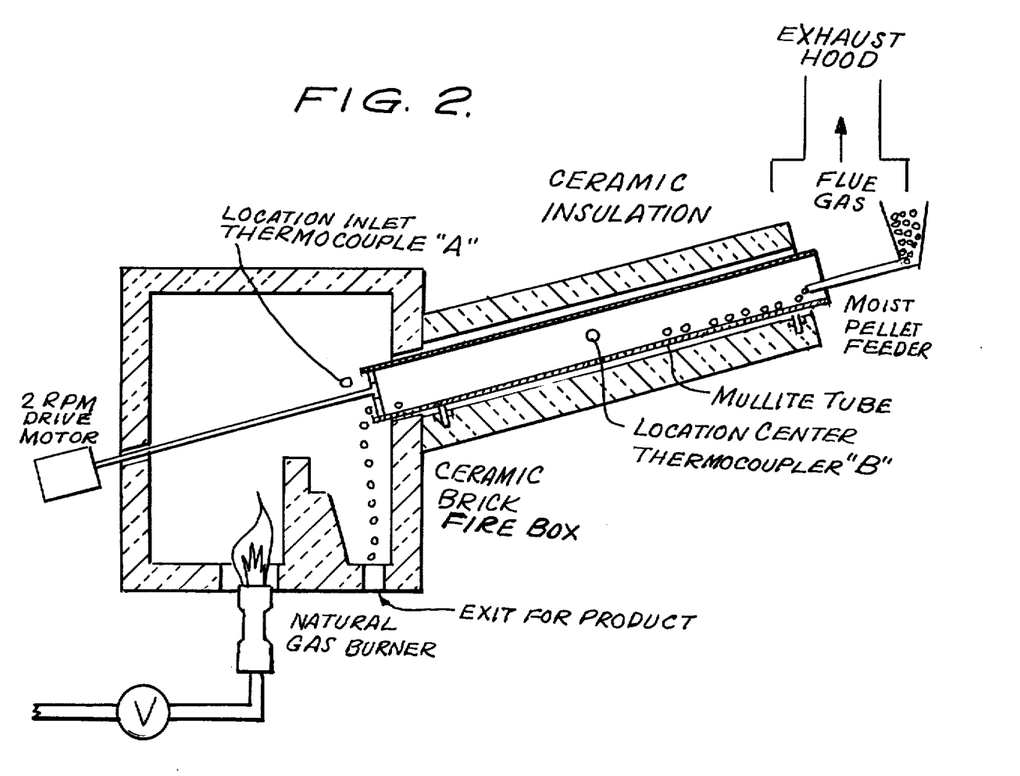
FIG. 2 is a partially schematic partially cross-sectional representation of a laboratory rotary kiln for sintering agglomerated glass particles

The selected particles are sintered in, e.g., a rotary kiln, such as that shown in FIG. 2, with an internal temperature of approximately 1250° F. (677° C.).

The kiln temperature is based upon the softening and melting points of the glass employed. Such temperature is advantageously above the softening point and below the melting point of such glass.

Suitable rotary kilns are commercially available and their specific structure is not part of the present invention.

As the composite glass particles slowly progress through the rotary kiln, the particles of pulverized glass (loosely held together by the binder) soften sufficiently so that the particles adhere together and form a porous, but very hard, pellet. The retention time in the kiln and the kiln temperature determine the ultimate specific gravity of the pellets. Higher temperatures and/or longer-retention times result in pellets having lower specific gravities, whereas shorter retention times and/or lower temperatures result in sintered pellets with higher specific gravities. As an example, for a particular batch of crushed glass a kiln temperature of 1550° F. and a retention time of 14 minutes produced sintered pellets having a specific gravity of from about 1.3 to about 1.4, whereas a kiln temperature of 1475° F. and a retention time of 7 minutes produced sintered pellets having a specific gravity of about 2.1. As the time in the kiln and the kiln temperature are dependent upon the softening and melting point characteristics of the employed glass, the actual kiln temperature and retention time will naturally vary from batch to batch unless the same glass is employed throughout.

After leaving the kiln, the sintered pellets are, e.g., air cooled and classified, e.g. by screening, for different particle-size gradations. For example, those from 5 to 10 mesh and a specific gravity of about 1.25, those from 10 to 18 mesh and a specific gravity of about 1.5 and those from 18 to 35 mesh and a specific gravity of about 2.0 are separated from the others, which are recycled to the pulverizing operation.

Many methods of sintering are commercially known, and any suitable process is useful for this invention. Rotary kilns, multiple-hearth furnaces or travelling-grate sintering machines are appropriate. A moist-granule feeder permits granules of a selected size to pass at a controlled rate into the sintering device. The temperature within the sintering device must be carefully controlled in order to produce a material of a desired specific gravity. The length of time that the granules are within the sintering device is critical and affects the specific gravity. Such sintering is effected, e.g., by passing the moist granules into a rotary kiln. The temperature in the rotary kiln is maintained by proper positioning of suitable thermocouple-temperature-measuring devices. The speed of rotation of the rotary kiln is adjusted to produce the desired retention time. The retention time and temperature within the sintering device determine the specific gravity of the sintered pellet.

The sintered pellets are spherical or spheroidal in shape. Their size and specific gravities are controlled in accord with the previously-noted criteria.

Although filter beds of sintered-glass pellets (varying in size and in specific gravity), either alone or in combination with particles of one or more other materials, are useful for filter beds through which contaminated fluid flows upwardly from the bottom to the top, major advantages of this invention are realized when the produced filter beds have a normal down-flow feed of contaminated liquid.

EXAMPLE

Figure 3:
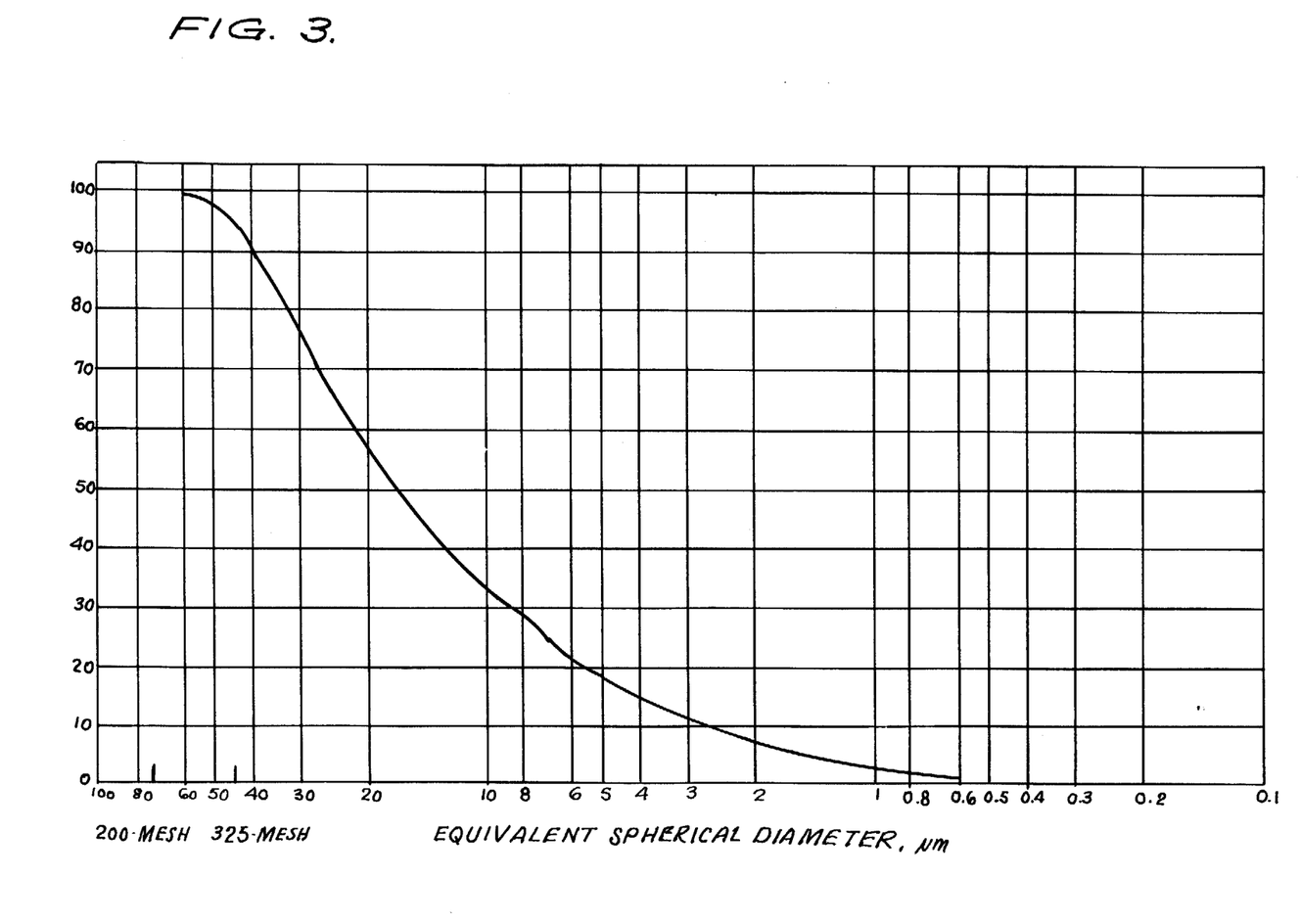
FIG. 3 is an illustrative particle-size-distribution curve for finely-ground glass.

Grind a 50-pound sample of waste glass (in crushed form and of approximately 50 mesh), having an analysis shown in Table I and taken from a solid-waste recycling center, in a ball mill so that at least 95 percent by weight passes a 100-mesh (U.S. Sieve Size) screen. An illustrative particle size distribution curve for such ground glass is shown in FIG. 3.

TABLE I

A typical analysis of employed waste glass is as follows:

| PHYSICAL | |
|---|---|
| Constituent | % by weight |
| Flint Glass (Clear) | 60 |
| Colored Glass | 30 |
| Iron | 0.1 to 2 |
| Tin | 0.1 to 2 |
| Aluminum | 0.1 to 5 |
| Organics, incl. labels, sticks and plastics | 0.1 to 1 |
| Size | 95% −200 Mesh |

| CHEMICAL | |
|---|---|
| Constituent | % by weight |
| $SiO_2$ | 66.9 |
| $Al_2O_3$ | 3.9 |
| $Fe_2O_3$ | .9 |
| $B_2O_3$ | 1.5 |
| $Na_2O$ | 11.4 |
| $K_2O$ | 1.0 |
| CaO | 8.3 |
| MgO | 2.1 |
| S | .2 |
| Loss on ignition | 2.6 |
| Trace elements[1] | .5 |

[1]Trace elements include Cu, Mn, Pb, and Zn.

Mix 480 parts by weight of the crushed glass in a suitable mixer with 3.6 parts by weight of lignin sulfonate and 116.4 parts by weight of water. A typical analysis of the lignin sulfonate is provided by Table II.

TABLE II
TYPICAL ANALYSIS OF LIGNIN SULFONATE

The material includes ammonium, calcium and sodium lignin sulfonates and also contains small amounts of natural sugars, principally mannose, glucose, xylose and galactose. High-molecular-weight carbohydrates are present in small amounts.
Properties based on the dry weight of 50% solution.

| | |
|---|---|
| Solids on Oven Drying | 94% |
| pH, 25% solution | 5 |
| Solubility in Water | Completely Soluble |
| % Base displaced $NH_3$ (on solids) | 4.3% |
| Total N, % $N_2$ | 4.2% |
| Reducing Sugars (as glucose) | 10% |
| Total Sulfur | 6% |
| Ash % | 1% |
| Sodium | 0.3% |
| Calcium | 0.1% |
| Insolubles ($CaSO_4$) | 1.0% |
| Hydrogen | 5.0% |
| Methoxyl ($OCH_3$) | 8.5% |
| Lignin Sulfonates | 80.0% |

The obtained aqueous admixture of finely-ground glass particles and lignin sulfonates has a lignin-sulfonate concentration of approximately 0.6 percent by weight. Continue thorough admixing for from about 15 to about 20 minutes.

The crushed glass is alternatively admixed with any other suitable binder, e.g. sodium silicate, bentonite, fuller's earth, cornstarch, hydrated lime, molasses, asphalt, tar, pitch or Portland cement. The concentration of binder in the admixture with pulverized glass varies from about 0.25 to about 10 percent by weight. When a lignin-based binder is employed, the lignin concentration is advantageously from about 0.2 to about 1.0 percent by weight, based on the weight of the dry glass.

Place the aqueous admixture of lignin sulfonate and finely-ground glass on a No. 5 (U.S. Sieve Size) screen over a pan-type pelletizer so that particles of less than 5 mesh fall into the pelletizer. Concurrently add just enough additional pulverized glass (at least 95 percent by weight passing 100 mesh) to the pelletizer to keep individual composite particles or granules of less than 5 mesh from agglomerating with other such particles.

In this particular example finely-divided glass particles in admixture with binder are passed through a screen into a pelletizer which is employed virtually only for forming granules. Granules or other composite particles of pulverized glass are optionally formed in any other conventional manner.

Collect the pellets formed in the pan pelletizer, which are now semi-dry, and screen them into three fractions, those of from 5 to 10 mesh, those from 10 to 18 mesh and those from 18 to 35 mesh. Sinter these fractions under different conditions to produce a different density or specific gravity for each so that a reverse-graded filter bed can be prepared from the obtained sintered pellets. Sinter the fraction of from 5 to 10 mesh to obtain a specific gravity of about 1.25, the fraction from 10 to 18 mesh to obtain a specific gravity of about 1.50 and the fraction of from 18 to 35 mesh to obtain a specific gravity of about 2.6.

To produce the designated specific gravities for the respective fractions, process each fraction separately through a kiln, such as that shown in FIG. 2, according to the conditions set forth in Table III. The rotary kiln shown in FIG. 2 has a moist-granule feeder which permits granules of a selected size to pass individually into the rotating tube of the rotary kiln. The speed of the rotating tube is not critical, but is suitably about 2 revolutions per minute. The temperature in the kiln is determined and controlled by two thermocouples, A and B. Thermocouple A is within the kiln (from which all heat originates) proper at its inlet end, and thermocouple B is within and at approximately the center of the rotating tube (through which moist granules pass on the way to the firebox) about 10 inches from the exhaust end of the tube. The tube itself is suitably about 3.5 inches in diameter and about 3 feet long. Temperature output from the respective thermocouples corresponds to ultimate specific gravity of sintered pellets. To produce a specific gravity of approximately 1.25 for the 5- to 10-mesh granules, adjust that temperature in the kiln so that thermocouple A (the thermocouple within the kiln itself) has a reading of approximately 1655° F. (901° C.) and thermocouple B has a reading of approximately 990° F. (531° C.). To produce a specific gravity of about 1.50 for the 10- to 18-mesh material, heat the kiln so that thermocouple A has a reading of about 1545° F. (840° C.) and thermocouple B has a reading of about 965° F. (519° C.). To obtain a specific gravity of about 2.0 or greater for the 18- to 35-mesh material, heat the kiln so that thermocouple A reads approximately 1503° F. (819° C.) and thermocouple B reads about 903° F. (482° C.). Concurrently process the respective granules through the rotary kiln so that they remain within the tube itself for a period of about 12 to about 14 minutes.

TABLE III
TEMPERATURE & TIME IN KILN TO OBTAIN DESIRED SPECIFIC GRAVITY

| SIZE U.S. MESH | DESIRED SPECIFIC GRAVITY (Apparent) | TIME IN KILN MINUTES | INLET TEMPERATURE °C. | INLET TEMPERATURE °F. | CENTER TEMPERATURE °C. | CENTER TEMPERATURE °F. |
|---|---|---|---|---|---|---|
| 5–10 | 1.25 | 12–14 | 901 | 1655 | 531 | 990 |
| 10–18 | 1.50 | 12–14 | 840 | 1545 | 519 | 965 |
| 18–35 | 2.0 | 12–14 | 819 | 1503 | 482 | 903 |

Depending upon the type of glass employed, the kiln should be adjusted to obtain temperatures from 900° to 1900° F. and the rotating tube should be adjustable so as to vary the residence time for from 3 to 30 minutes. The obtained pellets are preferably from 0.1 to 10 millimeters in diameter and vary inversely in specific gravity from about 2.6 to about 1.0, the smaller sintered pellets having the higher specific gravity.

Even with the indicated adjustments, control of specific gravity is not perfect and granules of a selected size range may not all necessarily result in sintered particles having the same specific gravity. Classify, e.g. hydraulically, the sintered particles in each size range and separate out those that do not meet requirements. Thus-separated sintered particles are optionally recycled to the pulverizing step or reprocessed through the rotary kiln for further heat treatment to achieve the desired specific gravity for the particular size particle.

Prepare a cylindrical filter bed about 60 centimeters in height and about 15 centimeters in diameter containing approximately equal volumes of sintered pellets from each of the three ranges of size and specific gravity. Arrange the filter so that the inlet upper end contains the larger-sized sintered pellets, and the size of the pellets decreases from the upper end toward the lower outlet end. Pass contaminated liquid, e.g. water or waste water, through the filter at a rate of approximately 20 gallons per minute per square foot of surface. When the filter is blocked sufficiently to retard the flow of liquid therethrough, backwash the filter with clean water. A single-medium inverse-graded bed requires from 20 to 40 percent less backwash water for cleaning than do other filter beds composed of different filter media. A filter bed of sintered-glass pellets which vary in size and specific gravity is optionally combined with one or more other filter media, e.g. silica sand, garnet, ilmenite or anthracite, in the same bed.

A similar cylindrical filter bed of about 70 centimeters in height and with the lowermost 10 centimeters composed of approximately 35- to 70-mesh garnet, ilmenite or silica sand performs similarly, but has the added advantage of even finer filtration.

The proportion of filtering media of each selected size range is optionally varied to facilitate the filtration of any particular contaminated liquid, depending upon the liquid itself and the nature of solid contaminants therein. The relevant factors are well known to those skilled in the art and do not, per se, constitute a critical part of this invention.

A further example of a filter bed prepared entirely of sintered-glass pellets has approximately equal volumes of sintered pellets ranging from 3 to 4 millimeters in diameter, of sintered pellets ranging from 0.6 to 3 millimeters in diameter and from sintered pellets ranging from 0.3 to 0.6 millimeters in diameter. The largest-sized pellets range in specific gravity from about 1.35 to about 1.45; the smallest-sized pellets range in specific gravity from about 2.3 to about 2.6; and the intermediately-sized pellets range inversely with particle size from a specific gravity of about 1.45 to a specific gravity of about 2.3.

The concepts of solids capture is generally recognized in wastewater filters as a meaningful method of comparing filter performance. Actual operating data comparing a glass-granule filter bed (according to this invention) with a conventional anthracite/sand dual-media filter bed on both water and wastewater confirm that the solids capture for the glass granules is over twice that of the conventional dual-media filter.

Figure 4:
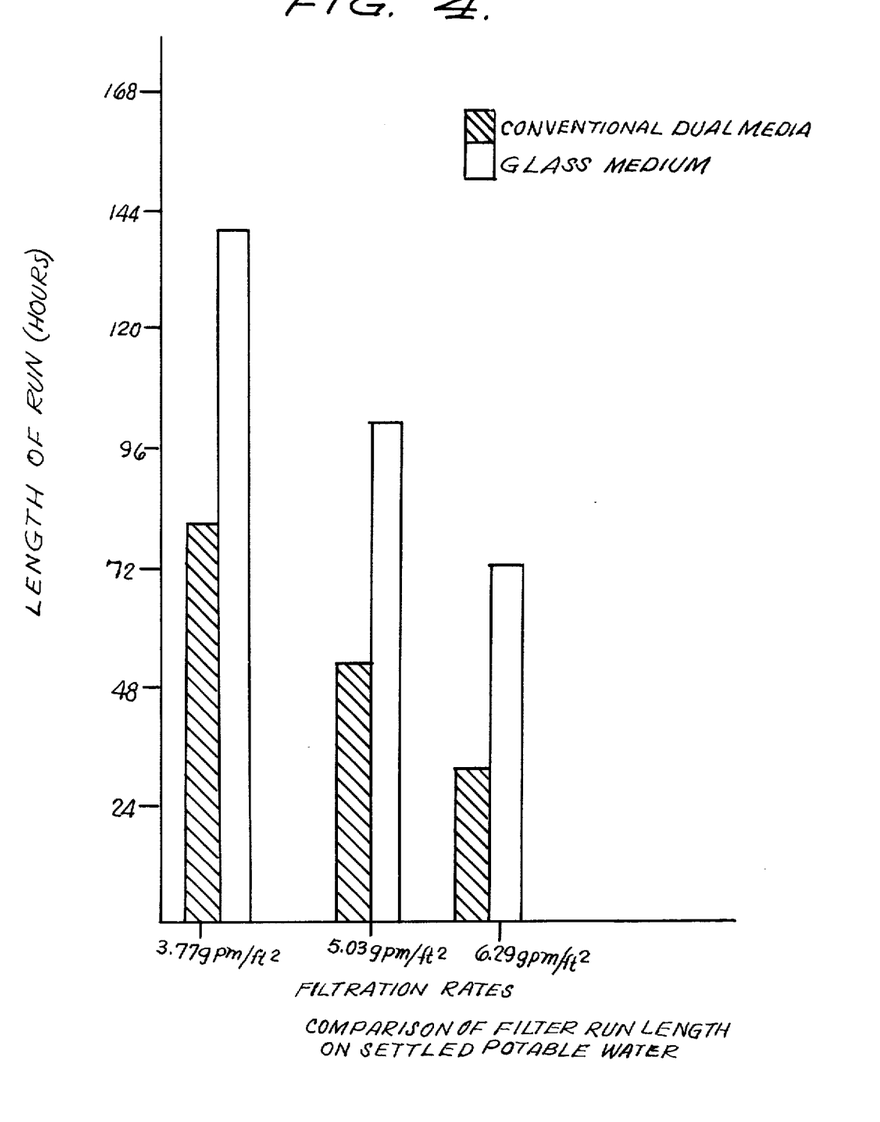
FIG. 4 is a graph of comparative filter-media performance.

FIG. 4 graphically presents data from a water-treatment plant. It is a plot of filter-run length for a glass-granule filter compared to that for a conventional dual-media filter at three different rates. The respective filters were operated to a head loss of six feet. In the order of increasing flow rates the filter according to this invention outlasted its conventional counterpart by about 70, about 90 and about 130 percent, respectively.

The invention and its advantages are readily understood from the preceding description. Various changes may be made in the process, in the employed glass, in the binding agent, in the formation of agglomerates, in the sintering operation, in the formation of the filter bed and in the filter bed itself without departing from the spirit and scope of the invention or sacrificing its material advantages. The process and products described herein are merely illustrative of preferred embodiments of the invention.

What is claimed is:

1. A filter bed having an inlet end and an outlet end and consisting essentially of particles which vary in size and in specific gravity from coarse particles of relatively low specific gravity at the inlet end to finer particles of higher specific gravity at the outlet end,
   each particle being a glass pellet of from about 5 to about 35 mesh (U.S. Sieve Size), having a specific gravity of from about 1.00 to about 2.60 and consisting essentially of a sintered granule of glass particles, at least 95 percent of which were finer than 100 mesh prior to sintering,
   each granule being a non-compacted loosely-formed agglomerate of a (solid particles)/binder admixture, the solid particles of which consist essentially of glass particles.

2. A filter bed according to claim 1 wherein the particles vary in size from the inlet end to the outlet end from particles of from about 5 to about 10 mesh to particles of from about 18 to about 35 mesh, respectively, with intermediately-sized particles therebetween.

3. A filter bed according to claim 2 with particles of from about 5 to about 10 mesh having a specific gravity of about 1.25, with particles of from about 10 to about 18 mesh having a specific gravity of about 1.5 and with particles of from about 18 to about 35 mesh having a specific gravity of about 2.6.

4. A process wherein a) contaminating solids are removed from a liquid contaminated therewith by passing the liquid through a filter bed according to claim 1 from the inlet end to the outlet end, b) removed solids are separated from the filter bed by reverse flushing with noncontaminated liquid, and c) the filter bed is reformed with particles varying in size from coarse particles at the inlet end to finer particles at the outlet end by permitting the particles to settle according to their respective specific gravities.

5. A process according to claim 4 wherein the contaminated liquid is contaminated water.

6. A filter bed having an inlet end and an outlet end, having particles which vary in size and in specific gravity from those of from about 5 to about 10 mesh (U.S. Sieve Size) and from a specific gravity of from about 1.00 to about 1.45 at the inlet end to finer particles of higher specific gravity at the outlet end, and wherein each particle at the inlet end is a glass pellet comprising a granule of sintered glass particles, at least 95 percent of which were finer than 100 mesh prior to being sintered, each granule of sintered glass particles being a non-compacted loosely-formed agglomerate of a (solid particles)/binder admixture, the solid particles of which consist essentially of glass particles.

7. A filter bed according to claim 6 wherein each particle at the outlet end is a member selected from the group consisting of garnet, ilmenite and silica sand.

8. A graduated filter bed with an inlet end and an outlet end and comprising sintered-glass pellets which decrease in size and increase in density from the inlet end toward the outlet end, each pellet being composed of sintered-glass particles, having a density within the range of from 1.0 to 2.6 grams per cubic centimeter and having a particle size within the range of from 0.1 to 10.0 millimeters in maximum diameter each sintered-glass pellet comprising a granule of sintered glass particles, said granule being a non-compacted loosely-formed agglomerate of a (solid particles)/binder admixture.

9. A filter bed according to claim 8 comprising sintered-glass pellets having a density within the range of from 2.3 to 2.6 grams per cubic centimeter.

10. A filter bed according to claim 8 comprising sintered-glass pellets having a maximum diameter in the range of from 0.3 to 0.6 millimeter and a density within the range of from 2.3 to 2.6 grams per cubic centimeter.

11. A filter bed according to claim 8 comprising sintered-glass pellets having a density of from 1.45 to 2.3 grams per cubic centimeter.

12. A filter bed according to claim 8 comprising sintered-glass pellets having a maximum diameter of from 0.6 to 3.0 millimeters and a density within the range of from 1.45 to 2.3 grams per cubic centimeter.

13. A filter bed according to claim 8 comprising sintered-glass pellets having a density of from 1.35 to 1.45 grams per cubic centimeter.

14. A filter bed according to claim 8 comprising sintered-glass pellets having a maximum diameter within the range of from 3 to 4 millimeters and a density within the range of from 1.35 to 1.45 grams per cubic centimeter.

15. A filter bed according to claim 8 having sintered-glass pellets of at least two different particle sizes and densities.

16. A filter bed according to claim 8 wherein the graduated filter bed consists essentially of sintered-glass particles which vary in particle size and density.

17. A graduated filter bed with an inlet end and an outlet end and comprising sintered-glass pellets which decrease in size and increase in density from the inlet end toward the outlet end, each pellet being composed of sintered-glass particles, having a density within the range of from 1.0 to 2.6 grams per cubic centimeter and having a particle size within the range of from 0.3 to 10.0 millimeters in maximum diameter each sintered-glass pellet comprising a granule of sintered glass particles, said granule being a non-compacted loosely-formed agglomerate of a (solid particles)/binder admixture.

18. A graduated filter bed with an inlet end and an outlet end and comprising sintered-glass pellets which decrease in size and increase in density from the inlet end toward the outlet end, each pellet being composed of sintered-glass particles, having a density within the range of from 1.0 to 2.6 grams per cubic centimeter and having a particle size within the range of from 0.3 to 4 millimeters in maximum diameter each sintered-glass pellet comprising a granule of sintered glass particles, said granule being a non-compacted loosely-formed agglomerate of a (solid particles)/binder admixture.

19. A graduated filter bed with an inlet end and an outlet end and comprising sintered-glass pellets which decrease in size and increase in density from the inlet end toward the outlet end, each pellet being composed of sintered-glass particles, having a density within the range of from 1.0 to 2.6 grams per cubic centimeter and having a particle size within the range of from 0.5 to 3 millimeters in maximum diameter each sintered-glass pellet comprising a granule of sintered glass particles, said granule being a non-compacted loosely-formed agglomerate of a (solid particles)/binder admixture.

* * * * *